(12) United States Patent
Kimoto

(10) Patent No.: US 7,199,553 B2
(45) Date of Patent: Apr. 3, 2007

(54) BATTERY PACK APPARATUS AND COOLING DEVICE THEREOF

(75) Inventor: Shinya Kimoto, Toyohashi (JP)

(73) Assignee: Panasonic EV Energy Co., Ltd., Kosai (JP)

( * ) Notice: Subject to any disclaimer, the term of this patent is extended or adjusted under 35 U.S.C. 154(b) by 367 days.

(21) Appl. No.: 10/800,682

(22) Filed: Mar. 16, 2004

(65) Prior Publication Data

US 2004/0183504 A1 Sep. 23, 2004

(30) Foreign Application Priority Data

Mar. 18, 2003 (JP) ............................. 2003-073435

(51) Int. Cl.
*H02J 7/00* (2006.01)
*H02M 6/50* (2006.01)

(52) U.S. Cl. ...................... 320/112; 320/100

(58) Field of Classification Search ................ 320/112, 320/100
See application file for complete search history.

(56) References Cited

U.S. PATENT DOCUMENTS

| | | | |
|---|---|---|---|
| 5,322,745 A | 6/1994 | Yanagihara et al. | |
| 5,560,999 A | 10/1996 | Pedicini et al. | |
| 5,589,290 A | 12/1996 | Kline et al. | |
| 5,721,064 A | 2/1998 | Pedicini et al. | |
| 6,218,807 B1 | 4/2001 | Sakaue et al. | |
| 6,340,877 B1 | 1/2002 | Mita et al. | |
| 2001/0004199 A1 | 6/2001 | Sakaue et al. | |
| 2001/0004200 A1 | 6/2001 | Sakaue et al. | |
| 2002/0005708 A1 | 1/2002 | Kobayashi et al. | |
| 2002/0187390 A1 | 12/2002 | Kimoto et al. | |
| 2004/0004461 A1* | 1/2004 | Hamada et al. ............. | 320/112 |

FOREIGN PATENT DOCUMENTS

| | | |
|---|---|---|
| EP | 0920105 | 6/1999 |
| EP | 1174942 | 1/2002 |
| EP | 1265309 | 12/2002 |
| JP | 6-150963 | 5/1994 |
| JP | 8-96858 | 4/1996 |
| JP | 2001-167803 | 6/2001 |
| JP | 2001-167806 | 6/2001 |

OTHER PUBLICATIONS

English Language Abstract of JP 2001-167803.
English Language Abstract of JP 2001-167806.
English Language Abstract of JP8-96858.
English Language Abstract of JP 6-150963.

* cited by examiner

*Primary Examiner*—Adolf Deneke Berhane
*Assistant Examiner*—Yalkew Fantu
(74) *Attorney, Agent, or Firm*—Workman Nydegger

(57) ABSTRACT

A battery pack apparatus is configured with a battery pack composed of a plurality of rechargeable batteries arranged in parallel with cooling medium passages formed therebetween, and a cross flow fan which faces a distribution space formed adjacent to one side of the battery pack to supply or discharge cooling medium with respect to each of the cooling medium passages, and which is disposed such that the rotational axis thereof follows the aligning direction of the rechargeable batteries. The axial position of the fan is eccentric in the direction of movement of an impeller at an intake chamber side with respect to a center line of the distribution space, the line perpendicular to the aligning direction of the rechargeable batteries. The rechargeable batteries are uniformly cooled within a compact configuration.

19 Claims, 6 Drawing Sheets

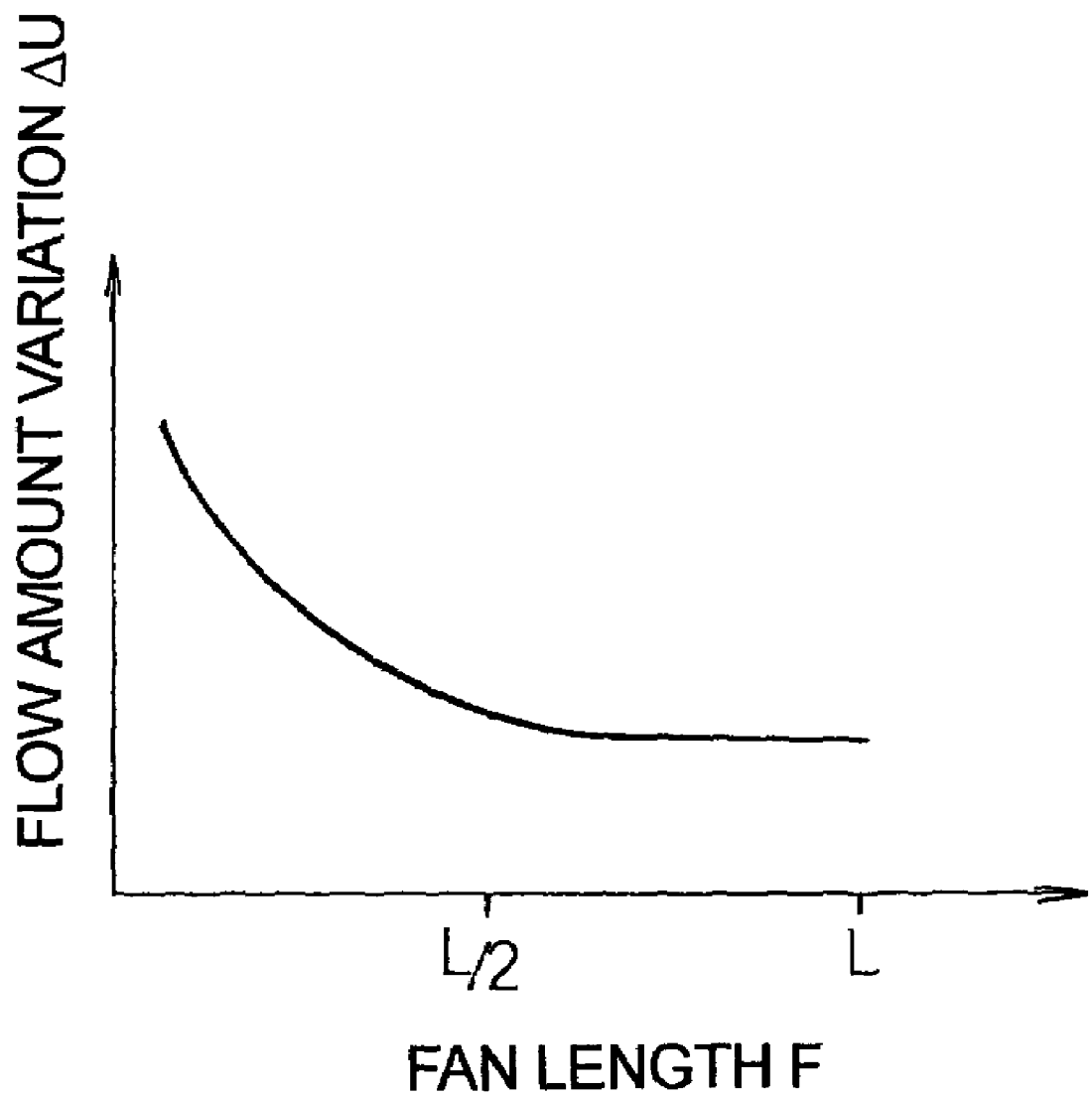

Prior Art

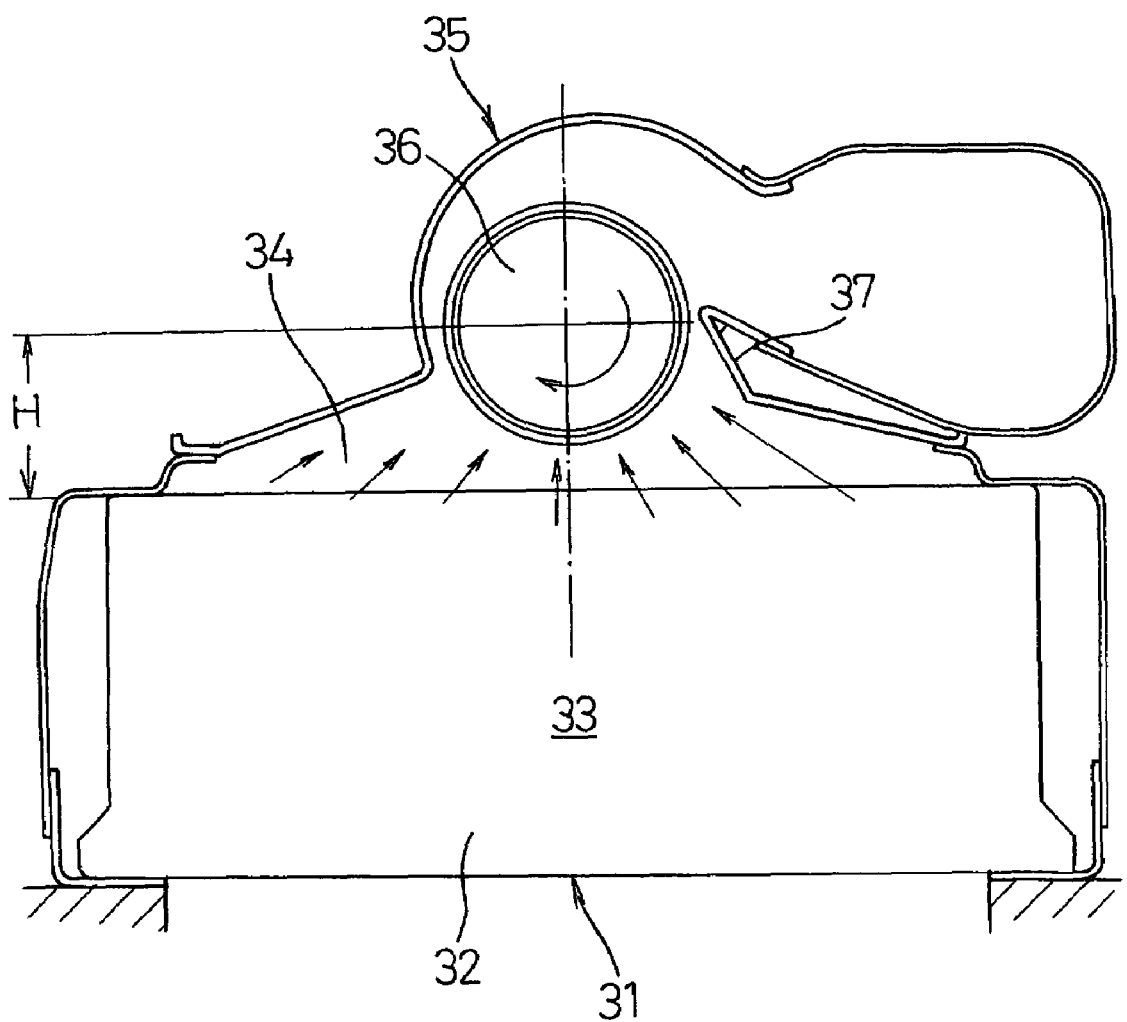

BATTERY PACK APPARATUS AND COOLING DEVICE THEREOF

The present disclosure relates to subject matter contained in priority Japanese Patent Application No. 2003-73435, filed on Mar. 18, 2003, the contents of which is herein expressly incorporated by reference in its entirety.

BACKGROUND OF THE INVENTION

1. Field of the Invention

The present invention relates to a battery pack apparatus. In particular, it relates to a battery pack apparatus comprising a battery pack composed of a plurality of rechargeable batteries and a fan supplying a cooling medium through cooling medium passages between the rechargeable batteries to uniformly cool each of the rechargeable batteries.

2. Description of the Related Art

Apparatuses are known in the art wherein a supply space and a discharge space are disposed above and below a battery pack composed of a plurality of rechargeable batteries arranged in parallel and separated by cooling medium passages formed therebetween, and a cooling medium supply device is disposed to supply cooling medium from one end of the supply space (for example, see Japanese Patent Laid-Open Publication No. 2001-167803).

Also, apparatuses are known wherein a battery pack is formed as an integral unit from a plurality of rechargeable batteries in a rectangular shape inclined in a vertical direction in a containing case, and a fan is disposed beside a lower end portion of the battery pack to supply cooling air to a supply space at an upper portion of the battery pack, the air then passing through passages between the rechargeable batteries and through a discharge space at the lower end and finally discharging outside, thereby cooling each of the rechargeable batteries (for example, see Japanese Patent Laid-Open Publication No. 2001-167806).

Apparatuses are also known wherein a plurality of rechargeable batteries are contained inside a case, and a fan having an impeller is disposed at one side of the case, the impeller having an axial length spanning substantially the entire length in the lengthwise direction of the case. In this apparatus, cooling air is forcedly supplied by the fan to each of the rechargeable batteries (for example, see Japanese Patent Laid-Open Publication No. Hei 8-96858).

An apparatus has also been conceived as shown in FIGS. 6A and 6B. An inflow passage 24 for cooling medium is disposed at a lower portion of a battery pack 21 which has a plurality of rechargeable batteries 22 arranged in parallel and separated by cooling medium passages 23 formed therebetween. A discharge space 25 of a relatively large capacity is disposed at an upper portion of the battery pack 21. A discharge device 26 such as a sirocco fan is disposed at a substantially central portion of an upper surface of the discharge space 25.

However, with the configuration disclosed in Japanese Patent Laid-Open Publication No. 2001-167803, each of the cooling medium passages between the rechargeable batteries, depending on which position in the supply space they communicate, a difference occurs in the circulation amount of the cooling medium, and temperature variations occur among the rechargeable batteries.

The configuration disclosed in Japanese Patent Laid-Open Publication No. 2001-167806 provides a solution to this kind of problem. However, to do so it is necessary to locate the battery pack with an inclination, and the installation configuration is thus complicated. Since a fan is disposed at a side of one end in the lengthwise direction of the battery pack, the entire length is undesirably long.

Also, with the configuration shown in FIGS. 6A and 6B, if the height dimension of the discharge space 25, i.e. a distance H from an upper edge of the battery pack 21 to the discharge device 26, is not large enough, it is not possible to equalize the flow amount of cooling medium passing through the cooling medium passages 23 between the respective rechargeable batteries 22, 22. Thus, a compact configuration in the vertical direction cannot be achieved.

As shown in FIG. 7, a configuration was conceived wherein a cross flow fan 35 is disposed facing a discharge space 34 formed at an upper portion of a battery pack 31, the rotational axis of the fan following in the aligning direction of rechargeable batteries 32. However, by making a distance H between an upper edge of the battery pack 31 and the axis of the cross flow fan 35 as small as possible to facilitate a compact configuration in the vertical direction, variations occur in the flow amount of cooling medium in cooling medium passages 33 between the rechargeable batteries 32,32. That is, the flow rate distribution of cooling medium in the discharge space 34, as indicated by the length of the arrows in FIG. 7, is characterized by a large flow rate at an upper area in the direction of movement of an impeller 36 of the cross flow fan 35, i.e. at an area near a stabilizer 37, but as the distance gets farther away the flow rate decreases. As a result, cooling ability of each of the rechargeable batteries 32 varies depending on the location thereof, thereby causing temperature variations. When the rechargeable batteries 32 are made up from a plurality of cells arranged in parallel, variations occur in the battery temperature and in the SOC between the cells, decreasing the life time of the rechargeable batteries 32.

SUMMARY OF THE INVENTION

The present invention is devised in light of the aforementioned conventional problems. An object of the present invention is to provide a battery pack apparatus which is capable of uniformly cooling each of the rechargeable batteries of a battery pack within a compact configuration.

A battery pack apparatus according to the present invention includes a battery pack composed of a plurality of rechargeable batteries arranged in parallel, the rechargeable batteries having cooling medium passages formed therebetween, and a cross flow fan disposed with an intake chamber facing a distribution space formed adjacent to one side face of the battery pack to supply or discharge cooling medium to each of the cooling medium passages, the fan having an impeller disposed such that a rotational axis thereof follows an aligning direction of the rechargeable batteries. An axial position of the fan is eccentric with respect to a center line of the distribution space, perpendicular to the aligning direction of the rechargeable batteries, in a direction of movement of the impeller at the distribution space side. Although the fan is disposed within proximity of one side face of the battery pack to configure the battery pack apparatus compactly, by disposing the cross flow fan with the axis thereof following the aligning direction of the rechargeable batteries, cooling medium is supplied equally to each of the cooling medium passages. Further, by the axial position of the fan being eccentric in the direction of movement of the impeller at the distribution space side, flow amount distribution of the cooling medium in each cooling medium passage is equalized, and each of the rechargeable batteries is cooled uniformly, and variations in SOC of the rechargeable batteries are suppressed to improve the battery life.

Also, with another battery pack apparatus according to the invention, the length of a stabilizer of the cross flow fan is from 1.5 to 5 times the size of a gap between an extremity of the stabilizer and the outer circumference of the impeller, and an intake chamber wall doubles as an air discharge passage wall or is adjacent to an air discharge passage wall, where the fan being disposed with the intake chamber facing the distribution space and the rotational axis is made to follow the aligning direction of the rechargeable batteries. Although the fan is disposed in proximity to one side face of the battery pack to configure the battery pack apparatus compactly, the capacity at the stabilizer area of the intake chamber is large, and therefore flow amount decline at an end portion, near the stabilizer, within each cooling medium passage is restrained, such that variations in flow amount distribution is decreased and pressure loss is further decreased. Thereby, cooling ability is increased and variations thereof is decreased. Effectiveness as a stabilizer cannot be achieved by setting the length of the stabilizer less than 1.5 times the size of the gap. By setting the length of the stabilizer 1.5 times or more, a large air supply efficiency is secured even if the stabilizer is short. Also, if the length is more than 5 times the size of the gap, a sufficiently large capacity of the stabilizer area of the intake chamber cannot be obtained, and the mentioned effects cannot be achieved.

Also, by using the above-mentioned configurations together, while the axial position of the fan is made more largely eccentric in the direction of movement of the impeller to further equalize the flow amount distribution of the cooling medium within each of the cooling medium passages, flow amount decline at the end portions near the stabilizer is restrained such that variations in flow amount distribution and pressure loss are further decreased. Thereby, cooling ability is further increased and variations thereof is made smaller.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 5 is a characteristic diagram showing the relationship between fan length and flow amount variations between cooling medium passages in the embodiment;

FIG. 6A is a plan view thereof and FIG. 6B is a longitudinal sectional front view showing the general configuration; and FIG. 7 is a longitudinal sectional side view of a battery pack apparatus conceived at a stage previous to development of the battery pack apparatus of the present invention.

DETAILED DESCRIPTION OF THE PREFERRED EMBODIMENTS

Figure 1:
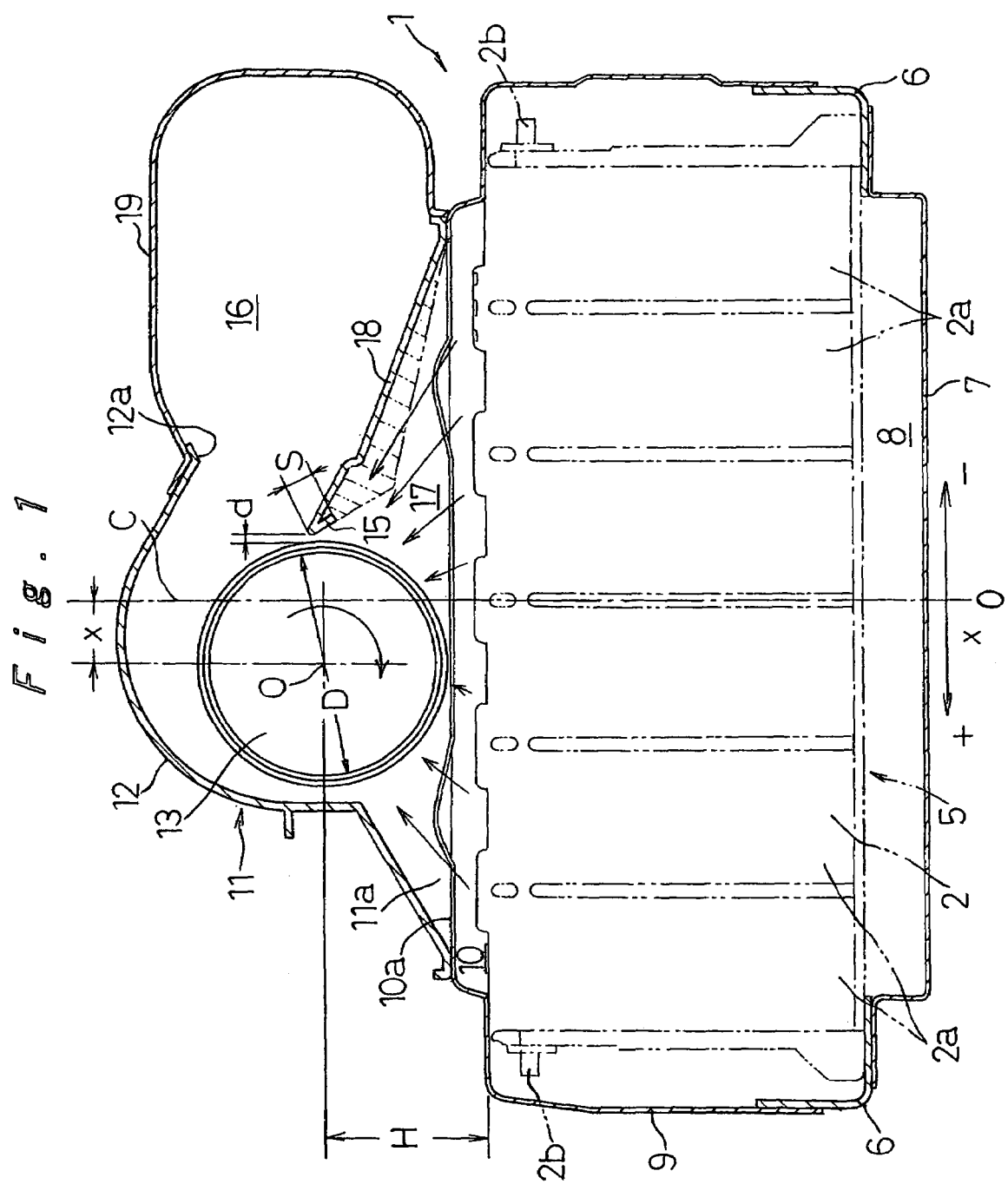
FIG. 1 is a longitudinal sectional side view of an embodiment of a battery pack apparatus according to the present invention.

Hereinafter, an embodiment of a battery pack apparatus in accordance with the present invention will be described with reference to FIGS. 1 to 5.

In FIGS. 1 through 4, a battery pack apparatus 1 serves as a drive power source for an electric vehicle including hybrid vehicles, and contains a battery pack 5 composed of 10 to 30 flat prismatic rechargeable batteries 2 arranged in parallel with cooling medium passages 3 formed between the long side faces thereof, and being held between a pair of end plates 4 disposed at both ends in the aligning direction, and secured as an integral unit by a binding member (not shown). Each of the rechargeable batteries 2 is formed as a battery module including a plurality (6 in the shown example) of cells $2a$ arranged in the lengthwise direction of the long side faces, the cells $2a$ being internally connected in series, and external connection terminals $2b$ projected at both ends. The battery pack 5 obtains a predetermined output voltage by successively connecting the connection terminals $2b$ of the rechargeable batteries 2 in series by bus bars (not shown).

Both ends of each of the rechargeable batteries 2 of the battery pack 5 are supported by support frames 6,6. A lower case 7 is disposed at a lower portion between the support frames 6,6. An inflow-end distribution space 8 is formed adjacent to a bottom side of the battery pack 5 by the lower case 7 to supply cooling medium to each of the cooling medium passages 3. Also, the battery pack 5 is covered by an upper case 9 at an upper portion of the support frames 6,6. An outflow-end distribution space 10 is projectingly formed adjacent to a top side of the battery pack 5 by the upper case 9 to collect cooling medium which has flowed out from each of the cooling medium passages 3 and discharge it. A suction opening $10a$ for sucking cooling medium is formed on a top side of the outflow-end distribution space 10.

A cross flow fan 11 is disposed on top of the upper case 9 with the axis thereof made to follow the aligning direction of the rechargeable batteries 2. An intake port $11a$ of the fan 11 is joined to the suction opening $10a$ of the upper case 9. The fan 11 includes a substantially tubular impeller 13 of a diameter D accommodated in a fan case 12, and the impeller 13 is disposed to be freely rotatable, and is rotated by a motor 14 linked to an end of its axis. Also, a stabilizer 15 is disposed at one side of the outer circumference of the impeller 13. A combined discharge passage/intake chamber wall 18 extends downward at an inclination from an end of the stabilizer 15 to join to a circumferential edge of the suction opening $10a$ of the upper case 9. An upper air discharge passage 16 and a lower intake chamber 17 are thus formed. An opening at one end of an air discharge duct 19 is joined to a discharge opening $12a$ of the fan case 12 and an outer edge of the combined discharge passage/intake chamber wall 18. The intake chamber 17 is formed by both a portion lower than the impeller 13 of the fan case 12 and the combined discharge passage/intake chamber wall 18, and a lower end opening thereof makes up the intake port $11a$ of the fan 11.

The position of the axis O of the fan 11, with respect to a center line C of the outflow-end distribution space 10, the line in a perpendicular direction to the aligning direction of the rechargeable batteries, is eccentric by an amount x in the direction of movement of the impeller 13 of the fan 11 at the intake chamber 17 side. The eccentricity amount x, with respect to the impeller diameter D of the fan 11, is set to satisfy 0<x<1.0D, and preferably, 0.2D<x<0.5D. According to this embodiment, D is 60 mm, and x is from 12 mm to 30 mm. Also, a length s of the stabilizer 15 is from 1.5d to 5d, where d is a gap between the extremity of the stabilizer 15 and the outer circumference of the impeller 13.

Figure 2:
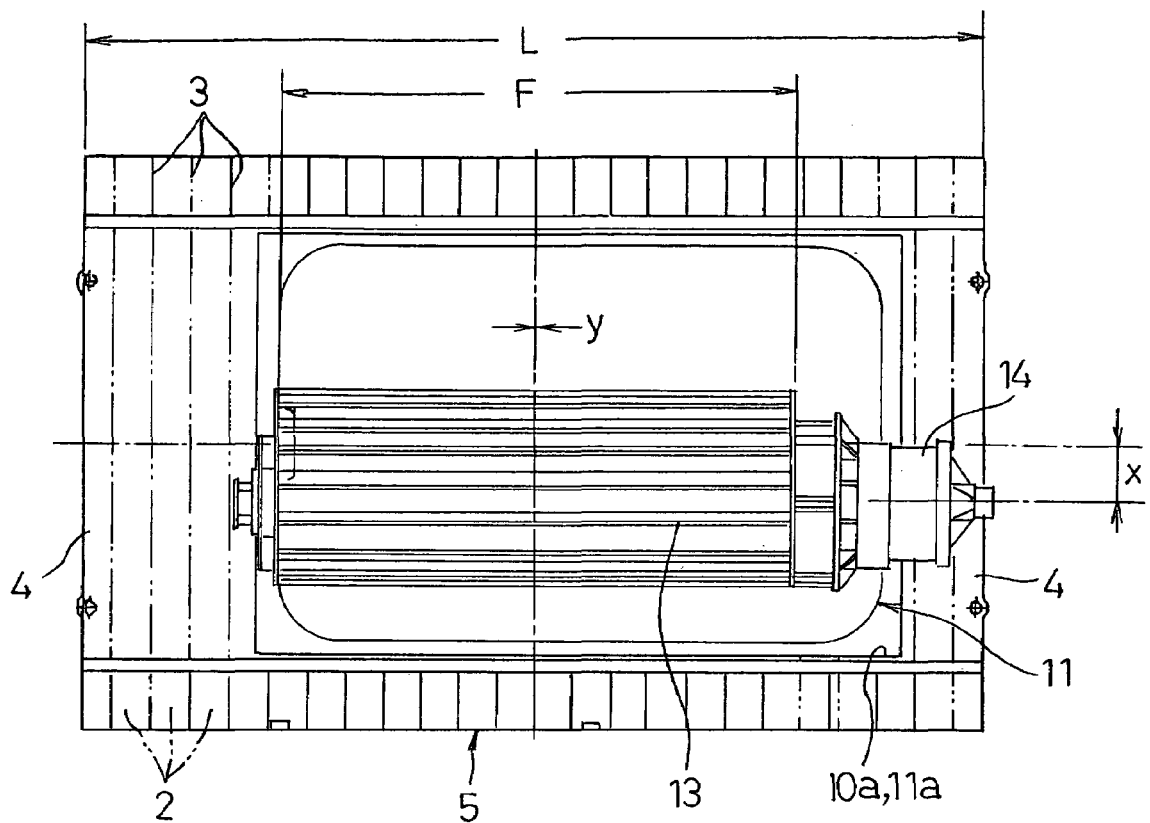
FIG. 2 is a plan view showing the positional relationship between a battery pack and a fan in the embodiment.

Also, as shown in FIG. 2, a length L in the aligning direction of the rechargeable batteries 2 of the battery pack 5 and a length F in the axial direction of the impeller 13 are set so as to satisfy F≧L/2. The axis of the fan 11 is disposed to be perpendicular with respect to the cooling medium passages 3. Also, the center of the impeller 13 in the axial direction is substantially matched with the center of the battery pack 5 in the aligning direction the rechargeable batteries. Specifically, the fan 11 is configured so as to satisfy y<L/n where y is a displacement amount of the center of the impeller 13 with respect to the center of the battery pack 5 is such that, L is the same as before, and n is the number of the rechargeable batteries 2 of the battery pack 5. That is, the displacement amount y is not larger than a thickness of the rechargeable battery 2.

Figure 3:
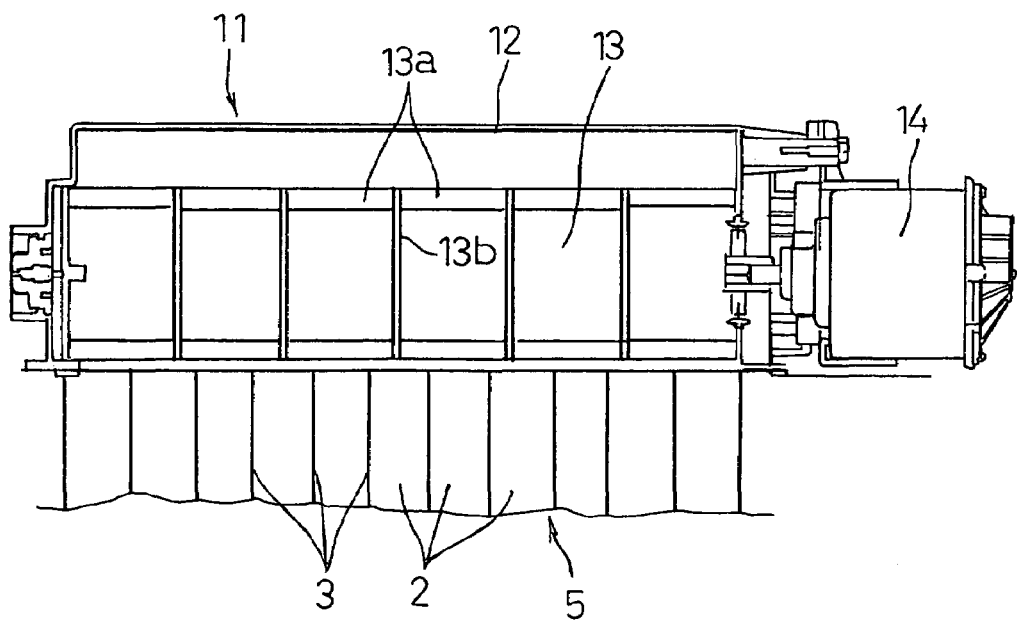
FIG. 3 is a partial longitudinal sectional front view showing positioning state of the fan in the embodiment.

Also, as shown in FIG. 3, the fan 11 is disposed such that the positions of junctures 13b in the axial direction of vanes 13a of the impeller 13 are offset from positions opposite to the cooling medium passages 3 between the rechargeable batteries 2,2.

According to the discussed configuration, the battery pack apparatus 1, which is compact in the aligning direction of the rechargeable batteries 2 due to the fan 11 being disposed on the upper portion of the battery pack 5, is compactly configured in the vertical direction as well. Thus, even though the fan 11 is disposed in proximity to the top side of the battery pack 5, by disposing the cross flow fan 11 with the axis thereof following the aligning direction of the rechargeable batteries 2, cooling medium is equally supplied to each of the cooling medium passages 3 between the rechargeable batteries 2,2. Further, by the axial position of the fan 11 being eccentric in the direction of movement of the impeller 13 at the intake chamber 17 side, the flow amount distribution of the cooling medium within each of the cooling medium passages 3 is equalized without significantly decreasing the cooling medium flow amount.

Figure 4:
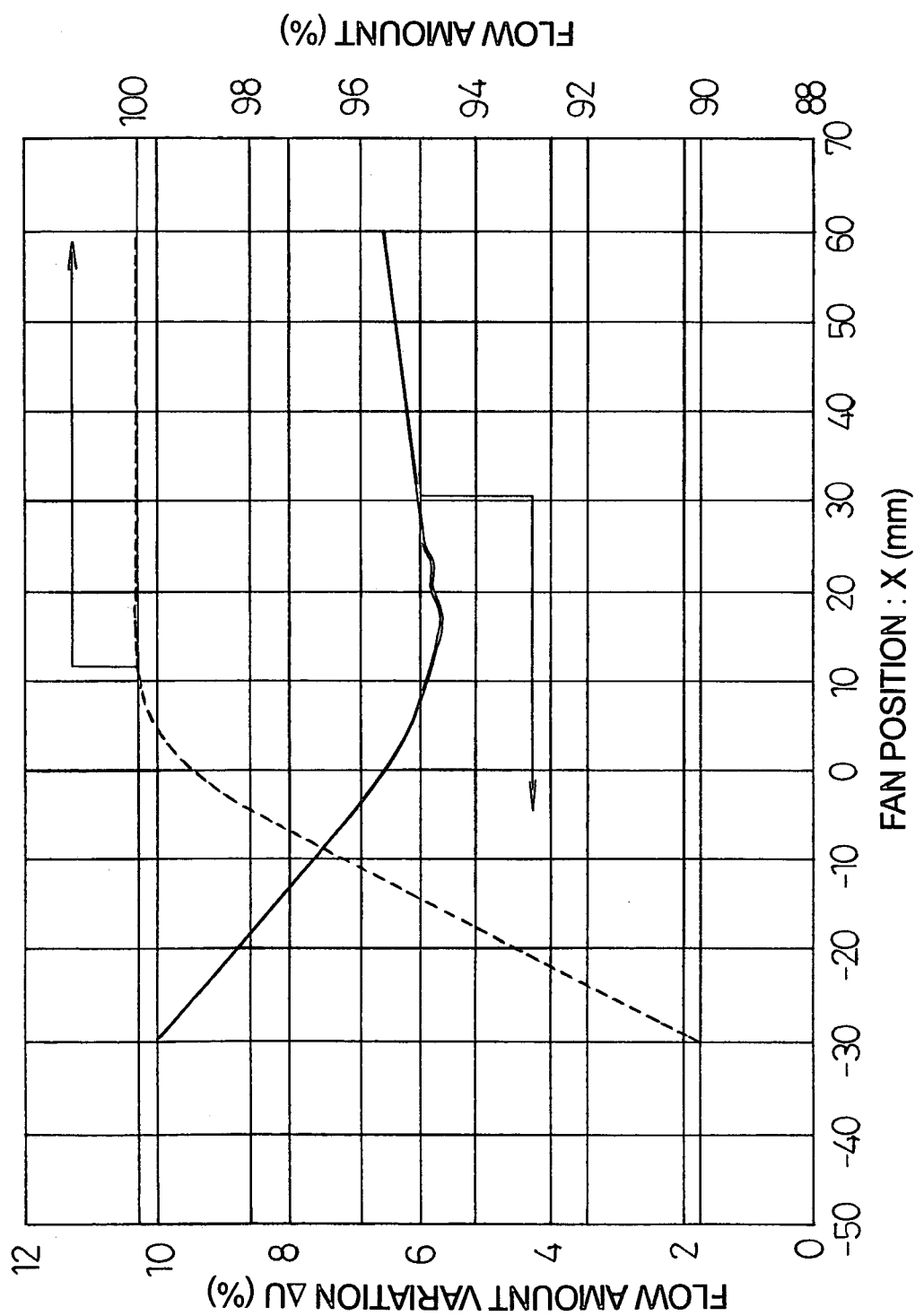
FIG. 4 is a characteristic diagram showing the relationship of fan positioning to both flow amount variations within cooling medium passages and cooling medium flow amount in the embodiment.
Figure 6A:
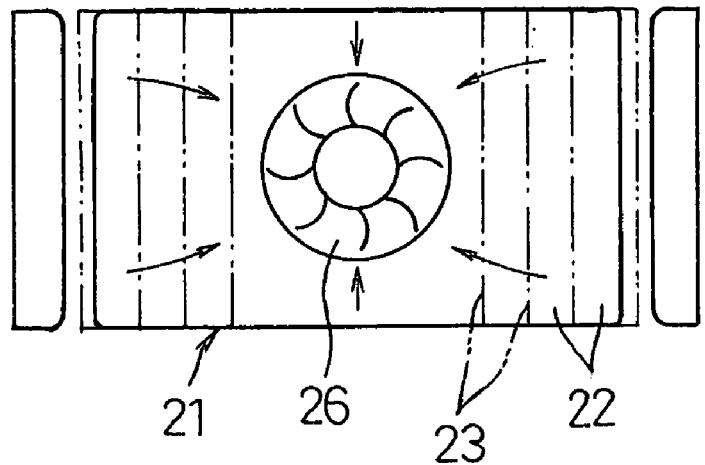
FIGS. 6A and 6B show a conventional battery pack apparatus having a fan; where
Figure 6B:
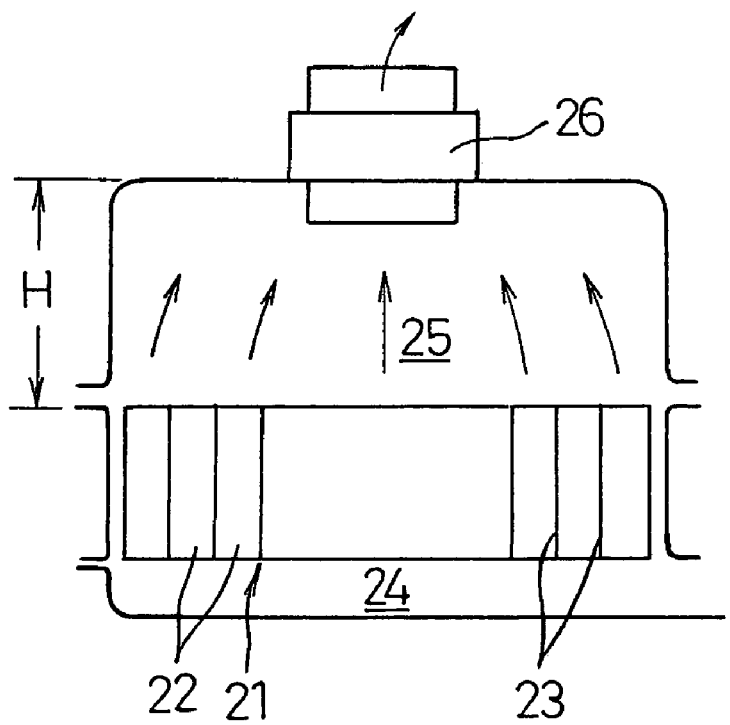

That is, as shown in FIG. 4, with the eccentricity amount x at 0 mm or less, the flow amount dramatically declines and flow amount variations dramatically become large. Although not shown in FIG. 4, even when x is 60 mm or more, the flow amount dramatically declines and flow amount variations become large. In contrast, at 10 mm or more and 30 mm or less, flow amount variations are settled within an extremely small range of 6% or less, and flow amount is maintained at substantially 100%. Accordingly, by setting the eccentricity amount x so as to satisfy 0<x<1.0D, preferably 0.2D<x<0.5D, flow amount distribution is equalized without decreasing flow amount.

Also, the length s of the stabilizer 15 of the fan 11 is set at from 1.5 to 5 times the gap d between the end of the stabilizer 15 and the outer circumference of the impeller 13, and the combined discharge passage/intake chamber wall 18 is extended from the end of the stabilizer 15, and thus the capacity of the intake chamber 17 is enlarged into the region indicated with the diagonal hypothetical lines in FIG. 1. Thus, as has been discussed, even though the axis of the fan 11 is eccentric in the direction opposite to the stabilizer 15, flow rate decline at an end of the stabilizer 15 side within each of the cooling medium passages 3 is restrained and variations of flow rate distribution is decreased, and, pressure loss is further decreased and cooling ability is increased and variations thereof is decreased.

Also, the length F of the impeller 13 in the axial direction is set so as to satisfy F≧L/2, with respect to the length L of the battery pack 5 in the aligning direction of the rechargeable batteries 2. Thus, as shown in FIG. 5, even when the fan 11 is disposed in proximity to the top side of the battery pack 5, cooling medium is equally supplied to each of the cooling medium passages 3 without increasing flow amount variations between the cooling medium passages 3.

Also, the fan 11 is disposed such that the axis thereof is perpendicular with respect to the cooling medium passages 3, and thus pressure loss is decreased and flow amount is large. Cooling ability is thereby improved. Also, the fan 11 is disposed so as to satisfy y<L/n, where y is the displacement amount of the center of the impeller 13 in the axial direction with respect to the center of the battery pack 5 in the aligning direction of the rechargeable batteries, L is the length of the battery pack 5 in the aligning direction of the rechargeable batteries, and n is the number of the rechargeable batteries 2. Thus, the cooling medium is equally supplied to the cooling medium passages 3.

Also, the fan 11 is disposed such that positions of the junctures 13b in the axial direction of the vanes 13a of the impeller 13 are offset from positions opposite to the cooling medium passages 3, and thus flow rate of all of the cooling medium passages 3 is equalized without being effected by the junctures 13b of the vanes 13a.

Accordingly, while the battery pack apparatus 1 is configured compactly by the cross flow fan 11 being disposed adjacent to one side face of the battery pack 5, variations in SOC of the rechargeable batteries 2 is restrained so as to improve the battery life due to an ability to uniformly cool the rechargeable batteries 2.

According to a battery pack apparatus of the present invention, even though a fan is disposed in proximity to one side face of a battery pack, by disposing a cross flow fan such that the axis thereof follows the aligning direction of the rechargeable batteries, cooling medium is equally supplied to each of the cooling medium passages between the rechargeable batteries. Further, by the axial position of the fan being eccentric in the direction of movement of the impeller at a side of the one side face of the battery pack, flow amount distribution of the cooling medium within each of the cooling medium passages is equalized, and each of the rechargeable batteries are uniformly cooled within a compact configuration, and variations in SOC of the rechargeable batteries are restrained to improve the battery life.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery pack apparatus comprising:
   a battery pack including a plurality of rechargeable batteries arranged in parallel and defining a predetermined direction, wherein the rechargeable batteries comprise at least one cooling medium passage provided therebetween; and
   a cross flow fan disposed with an intake chamber facing a distribution space formed adjacent a side face of the battery pack to supply or discharge a cooling medium to the at least one cooling medium passage, wherein the fan comprises an impeller disposed such that a rotational axis of the impeller is aligned with the predetermined direction of the rechargeable batteries, wherein
an axial position of the fan is eccentric with respect to a center line of the distribution space in a rotating direction of the impeller relative to the distribution space, wherein the center line is parallel to both the predetermined direction of the rechargeable batteries and the rotational axis of the impeller.

2. A battery pack apparatus comprising:
a battery pack including a plurality of rechargeable batteries arranged in parallel and defining a predetermined direction, wherein the rechargeable batteries comprise at least one cooling medium passage formed therebetween; and
a cross flow fan disposed with an intake chamber facing a distribution space formed adjacent a side face of the battery pack to supply or discharge a cooling medium to the at least one cooling medium passage, wherein the fan comprises an impeller disposed such that a rotational axis of the impeller is aligned with the predetermined direction of the rechargeable batteries, wherein
a length of a stabilizer of the fan is from 1.5 to 5 times the size of a gap between an extremity of the stabilizer and the outer circumference of the impeller, and an intake chamber wall comprises as an air discharge passage wall or is adjacent to an air discharge passage wall.

3. A battery pack apparatus comprising:
a battery pack including a plurality of rechargeable batteries arranged in parallel and defining a predetermined direction, wherein the rechargeable batteries comprise at least one cooling medium passage formed therebetween; and
a cross flow fan disposed with an intake chamber facing a distribution space formed adjacent a side face of the battery pack to supply or discharge a cooling medium to the at least one cooling medium passage, wherein the fan comprises an impeller disposed such that a rotational axis of the impeller is aligned with the predetermined direction of the rechargeable batteries, wherein
an axial position of the fan is eccentric with respect to a center line of the distribution space in a rotating direction of the impeller relative to the distribution space, wherein the center line is parallel to both the predetermined direction of the rechargeable batteries and the rotational axis of the impeller, and
a length of a stabilizer of the fan is from 1.5 to 5 times the size of a gap between an extremity of the stabilizer and the outer circumference of the impeller, and an intake chamber wall comprises as an air discharge passage wall or is adjacent to an air discharge passage wall.

4. The battery pack apparatus according to claim 1, wherein
an eccentricity amount x of the rotational axis of the fan with respect to a diameter D of the impeller satisfies $0 < x < 1.0D$.

5. The battery pack apparatus according to claim 1, wherein
an eccentricity amount x of the rotational axis of the fan with respect to a diameter D of the impeller satisfies $0.2D < x < 0.5D$.

6. The battery pack apparatus according to claim 1, wherein
the battery pack apparatus satisfies $F \geq L/2$ where L is a length of the battery pack in the predetermined direction of the rechargeable batteries and F is a length in the axial direction of the impeller.

7. The battery pack apparatus according to claim 1, wherein
The rotational axis of the fan is disposed to be perpendicular with respect to the at least one cooling medium passage.

8. The battery pack apparatus according to claim 1, wherein
the fan is disposed so as to satisfy $y < L/n$ where y is a displacement amount of the center of the impeller in the axial direction with respect to the center of the battery pack in the predetermined direction of the rechargeable batteries, L is a length of the battery pack in the predetermined direction of the rechargeable batteries, and n is the number of the rechargeable batteries of the battery pack.

9. The battery pack apparatus according to claim 1, wherein
the fan is disposed such that at least one juncture of vanes of the impeller in the axial direction are offset from the at least one cooling medium passage.

10. The battery pack apparatus according to claim 3, wherein
an eccentricity amount x of the axis of the fan with respect to a diameter D of the impeller satisfies $0 < x < 1.0D$.

11. The battery pack apparatus according to claim 3, wherein
an eccentricity amount x of the axis of the fan with respect to a diameter D of the impeller satisfies $0.2D < x < 0.5D$.

12. The battery pack apparatus according to claim 2, wherein
the battery pack apparatus satisfies $F \geq L/2$ where L is a length of the battery pack in the aligning direction of the rechargeable batteries and F is a length in the axial direction of the impeller.

13. The battery pack apparatus according to claim 3, wherein
the battery pack apparatus satisfies $F \geq L/2$ where L is a length of the battery pack in the aligning direction of the rechargeable batteries and F is a length in the axial direction of the impeller.

14. The battery pack apparatus according to claim 2, wherein
The rotational axis of the fan is disposed to be perpendicular with respect to the at least one cooling medium passage.

15. The battery pack apparatus according to claim 3, wherein
the rotational axis of the fan is disposed to be perpendicular with respect to the at least one cooling medium passage.

16. The battery pack apparatus according to claim 2, wherein
the fan is disposed so as to satisfy $y < L/n$ where y is a displacement amount of the center of the impeller in the axial direction with respect to the center of the battery pack in the predetermined direction of the rechargeable batteries, L is a length of the battery pack in the predetermined direction of the rechargeable batteries, and n is the number of the rechargeable batteries of the battery pack.

17. The battery pack apparatus according to claim 3, wherein
the fan is disposed so as to satisfy $y < L/n$ where y is a displacement amount of the center of the impeller in the axial direction with respect to the center of the battery pack in the predetermined direction of the rechargeable batteries, L is a length of the battery pack in the predetermined direction of the rechargeable batteries, and n is the number of the rechargeable batteries of the battery pack.

18. The battery pack apparatus according to claim 2, wherein
the fan is disposed such that at least one juncture of vanes of the impeller in the axial direction are offset from the at least one cooling medium passage.

19. The battery pack apparatus according to claim 3, wherein
the fan is disposed such that at least one juncture of vanes of the impeller in the axial direction are offset from the at least one cooling medium passage.

* * * * *